United States Patent

[11] 3,571,794

[72] Inventor Shih Y. Tong
Middletown, N.J.
[21] Appl. No. 670,942
[22] Filed Sept. 27, 1967
[45] Patented Mar. 23, 1971
[73] Assignee Bell Telephone Laboratories, Incorporated
Murray Hill, N.J.

[54] AUTOMATIC SYNCHRONIZATION RECOVERY FOR DATA SYSTEMS UTILIZING BURST-ERROR-CORRECTING CYCLIC CODES
18 Claims, 6 Drawing Figs.

[52] U.S. Cl. .......... 340/146.1, 178/69.5
[51] Int. Cl. .......... G06f 11/12, G08c 25/00
[50] Field of Search .......... 178/69.5; 235/153; 340/146.1

[56] References Cited
UNITED STATES PATENTS
3,305,636 2/1967 Webb .......... 178/69.5
3,336,467 8/1967 Frey .......... 235/153
3,373,404 3/1968 Webb .......... 340/146.1
3,466,601 9/1969 Tong .......... 340/146.1

*Primary Examiner*—Malcolm A. Morrison
*Assistant Examiner*—R. Stephen Dildine, Jr.
*Attorneys*—R. J. Guenther and Kenneth B. Hamlin

ABSTRACT: A method of providing automatic synchronization recovery in data transmission systems utilizing *b*-burst-error-correcting cyclic codes is disclosed. Synchronization recovery is accomplished by utilizing error patterns which, although not likely to occur in a transmission channel subject to burst error are nevertheless correctable by burst-error-correcting cyclic codes. In particular, the patterns utilized are those indicating that errors have occurred (simultaneously) at each end, but not the middle of the data word. By adding a specific preselected data sequence to each data word to be transmitted, subtracting the same fixed sequence from the received data sequences, and then decoding each resulting data word, such unlikely error patterns are obtained. These patterns indicate whether or not a synchronization gain or loss of up to *b*—2 symbols has occurred.

INVENTOR
S. Y. TONG
BY C. C. Lipton
ATTORNEY

| INFORMATION BITS APPLIED TO THE ENCODER 208 | CONTENTS OF ENCODER 208 AFTER APPLYING THE INFORMATION BIT SHOWN IN THE LEFT COLUMN | | | | | |
|---|---|---|---|---|---|---|
| BEFORE APPLICATION OF ANY BITS | 0 | 0 | 0 | 0 | 0 | 0 |
| 1 | 1 | 1 | 1 | 1 | 0 | 0 |
| 0 | 0 | 1 | 1 | 1 | 1 | 0 |
| 0 | 0 | 0 | 1 | 1 | 1 | 1 |
| 1 | 0 | 0 | 0 | 1 | 1 | 1 |
| 0 | 1 | 1 | 1 | 1 | 1 | 1 |
| 1 | 0 | 1 | 1 | 1 | 1 | 1 |
| 1 | 0 | 0 | 1 | 1 | 1 | 1 |
| 0 | 1 | 1 | 1 | 0 | 1 | 1 |
| 0 | 1 | 0 | 0 | 0 | 0 | 1 |

FIG. 5

WORD TRANSMITTED [F(X) + P(X)] = 000001001101000

WORD RECEIVED WITH SYNC. LOSS = 000000100110100

WORD RECEIVED + P(X) = 100000100110101

| BITS APPLIED TO THE ERROR LOCATOR 334 | CONTENTS OF SHIFT REGISTER 366 | | | | | | NO. OF SHIFTS (INDICATED BY COUNTER 343) |
|---|---|---|---|---|---|---|---|
| 1 | 1 | 1 | 1 | 1 | 0 | 0 | |
| 0 | 0 | 1 | 1 | 1 | 1 | 0 | |
| 1 | 1 | 1 | 0 | 0 | 1 | 1 | |
| 0 | 1 | 0 | 0 | 1 | 0 | 1 | |
| 1 | 0 | 1 | 0 | 0 | 1 | 0 | |
| 1 | 1 | 1 | 0 | 1 | 0 | 1 | |
| 0 | 1 | 0 | 0 | 1 | 1 | 0 | |
| 0 | 0 | 1 | 0 | 0 | 1 | 1 | |
| 1 | 0 | 0 | 1 | 0 | 0 | 1 | |
| 0 | 1 | 1 | 1 | 0 | 0 | 0 | |
| 0 | 0 | 1 | 1 | 1 | 0 | 0 | |
| 0 | 0 | 0 | 1 | 1 | 1 | 0 | |
| 0 | 0 | 0 | 0 | 1 | 1 | 1 | |
| 0 | 1 | 1 | 1 | 1 | 1 | 1 | |
| 1 | 0 | 1 | 1 | 1 | 1 | 1 | |
| | 1 | 1 | 0 | 0 | 1 | 1 | 1 |
| | 1 | 0 | 0 | 1 | 0 | 1 | 2 |
| | 1 | 0 | 1 | 1 | 1 | 0 | 3 |
| | 0 | 1 | 0 | 1 | 1 | 1 | 4 |
| | 1 | 1 | 0 | 1 | 1 | 1 | 5 |
| | 1 | 0 | 0 | 1 | 1 | 1 | 6 |
| | 1 | 0 | 1 | 1 | 1 | 1 | 7 |
| | 1 | 0 | 1 | 0 | 1 | 1 | 8 |
| | 1 | 0 | 1 | 0 | 0 | 1 | 9 |
| | 1 | 0 | 1 | 0 | 0 | 0 | 10 |
| | 0 | 1 | 0 | 1 | 0 | 0 | 11 |
| | 0 | 0 | 1 | 0 | 1 | 0 | 12 |
| INDICATES A SYNCHRONIZATION LOSS OF ONE BIT | 0 | 0 | 0 | 1 | 0 | 1 | 13 |

AUTOMATIC SYNCHRONIZATION RECOVERY FOR DATA SYSTEMS UTILIZING BURST-ERROR-CORRECTING CYCLIC CODES

BACKGROUND OF THE INVENTION

1. Field of the Invention

This invention relates to digital data transmission systems and more particularly to automatic synchronization recovery in data systems which utilize burst-error-correcting cyclic codes.

2. Description of the Prior Art

The need for accurate transmission and processing of digital data has long been recognized in such areas as telegraphy, telephony and computer and automation technology. Most often, such digital data is represented or coded in sequences of digital signals sometimes called code words. Each position in any sequence or code word consists of a digital symbol depending on the type of alphabet used. For example, if a binary alphabet is used, then each position consists of a bit -0 or -1. The different code word permutations of symbols represent different items of information.

Methods of improving the accuracy of transmission of information range from simple single-error detection schemes requiring the appending of a single digit to each code word to be transmitted to more elaborate schemes of error correction requiring the deliberate choice of special code words to represent the information or data. Examples of the latter are cyclic codes as described in "Error Correcting Codes" by W. W. Peterson, the M.I.T. Press, and John Wiley & Sons, 1961.

Each word in a cyclic code is a cyclic permutation of some other word in the code. Because of this characteristic, a loss of synchronization or synchronization slippage in the data system employing cyclic codes may not be detected by the receiver, in which case received words would be erroneously interpreted as being correct (see Bennett, W. R., Davey, R. Data Transmission, pages 297—299, McGraw-Hill Book Company, 1965). Even if such loss of synchronization resulted in the receiver detecting an error it may interpret such error as additive error (i.e., that caused by channel noise) rather than as arising from a loss of synchronization. This need for detecting loss of and restoring synchronization is present in nearly all digital data transmission systems.

One common method of providing transmitter and receiver synchronization is to separate or frame each transmitted code word. This separation may be accomplished either by inserting some distinctive sequence of symbols not used for message information or by inserting some distinctive signal different from the symbols used to represent the data. The disadvantage of the first scheme, of course, is that the additional redundancy provided for synchronization reduces the overall rate of information transmission. With the second scheme, the requirement of an additional signal for framing increases the bandwidth requirements of the communication channel. In either case, considerable expense may attach in providing for synchronization.

In applicant's copending patent application Ser. No. 535,164, filed Mar. 17, 1966, now U.S. Pat. No. 3,466,601 issued Sept. 9, 1969, automatic synchronization recovery techniques for data systems utilizing binary random-error-correcting cyclic codes are disclosed. In particular, code words to be transmitted from one location to another are first modified by the addition of a specific preselected binary word to the code words. At the receiving location another preselected binary word is subtracted from each received code word and the resultant processed to obtain an error pattern word. This word indicates either that no errors have occurred, that channel noise has introduced additive errors, or that loss of synchronization has occurred. If errors have occurred, steps are taken to correct the errors.

With the system discussed above, very little if any additional redundancy or increase in bandwidth is required. The system should therefore prove valuable for data systems which employ transmission channels which are subject to randomly distributed errors. Random-error-correcting codes are not generally utilized on transmission channels subject to burst errors, however, in which case, the above system would not be applicable.

SUMMARY OF THE INVENTION

It is an object of this invention, in view of the above-described prior art, to provide a data transmission system which is subject to burst errors with the capability of automatically correcting loss of synchronization.

Another object of this invention is to provide for detecting the direction of synchronization slippage in such data transmission systems, that is, for detecting whether the receiver has gained or lost symbols in the synchronizing process.

A further object of this invention is to enable the recovery of synchronization without requiring the transmission of additional framing symbols or a unique framing signal.

A still further object of the present invention is to enable the automatic recovery of synchronization in an efficient and economical fashion in data systems utilizing burst-error-correcting cyclic codes.

These and other objects of the present invention are illustrated in a specific system embodiment in which information signals to be transmitted from one location to another are first encoded into a $b$-burst-error-correcting cyclic code. Each resultant code word contains $k$ information symbols or digits and $(n—k)$ check digits and is capable of being decoded so as to correct a burst of errors of length $b$. (A $b$-length error burst is defined as being a sequence of $b$ digits in which, at least, the first and last are in error. Some of the intermediate digits may also be in error but this is not important to the definition of an error burst.) A specific preselected digital sequence is then added to each code word to be transmitted and then subtracted from each received word at the receiving location. The word obtained from subtraction is then processed to obtain what is called an error pattern word which indicates the positions in error in the received code word. This pattern is then processed to determine whether or not a synchronization gain or loss of up to $b—2$ data symbols has occurred. If it is determined that a gain or loss has occurred, the receiver initiates appropriate action to correct the synchronization slippage. If no slippage is detected, the error patterns are utilized in the usual manner to correct any additive error if there is such.

The error pattern obtained when a synchronization slippage occurs is one which indicates the occurrence of errors at each end, but not the middle, of the received code word—called an end-around burst. Such a pattern could be caused not only by the occurrence of a synchronization slippage, but also by the occurrence of additive errors at each end of the code word. Since the occurrence of the latter, however, is highly unlikely, such error patterns will always be interpreted as having been caused by a synchronization slippage, i.e., they will be used only in the correction of synchronization slippage. As indicated above, if a synchronization slippage does occur, the resulting error pattern will indicate both the direction and the amount, i.e., the number of symbols, of synchronization slippage.

By interleaving the code words to be transmitted, even greater protection against synchronization slippage can be obtained. In particular, if interleaving of degree $m$ is employed (i.e., $m$ code words at a time are interleaved), synchronization slippage of up to $m(b—1)—1$ symbols can be corrected.

It is a feature of this invention that a data communication system subject to burst errors utilizes a $b$-burst-error-correcting code to correct synchronization slippages of $\leq b—2$ data symbols.

It is also a feature of this invention that a data communication system utilizing a $b$-burst-error-correcting code includes a transmitting terminal in which code words to be transmitted to a receiving terminal are modified by the addition of a preselected digital sequence such that the resulting words obtained from said addition are processable to obtain an end-around error pattern when synchronization slippages occur.

It is another feature of this invention that the data communication system includes a receiving terminal in which the preselected digital sequence is subtracted from each received sequence and the resultant processed to obtain the end-around error pattern when synchronization slippages occur.

It is still another feature of this invention that the receiving terminal automatically adjusts synchronization when the end-around error patterns are obtained.

It is also a feature of this invention that the data communication system includes apparatus for correcting error bursts length $b$ as well as synchronization slippages.

It is another feature of this invention that a data communication system utilizing a $b$-burst-error-correcting code includes apparatus for interleaving the code words to be transmitted to a receiving terminal to a degree $m$, for deinterleaving the received words, and for automatically correcting synchronization slippages of $\leq m(b-1)-1$ symbols.

BRIEF DESCRIPTION OF THE DRAWING

A complete understanding of the present invention and of the above and other objects and advantages thereof may be gained from a consideration of the following detailed description of a specific illustrative embodiment presented hereinbelow in connection with the accompanying drawing, described as follows:

FIG. 5 depicts in tabular form the data contents of the shift register 366 of FIG. 3 after application to the shift register of the bits of a certain received data sequence.

DETAILED DESCRIPTION

Figures 1, 2:
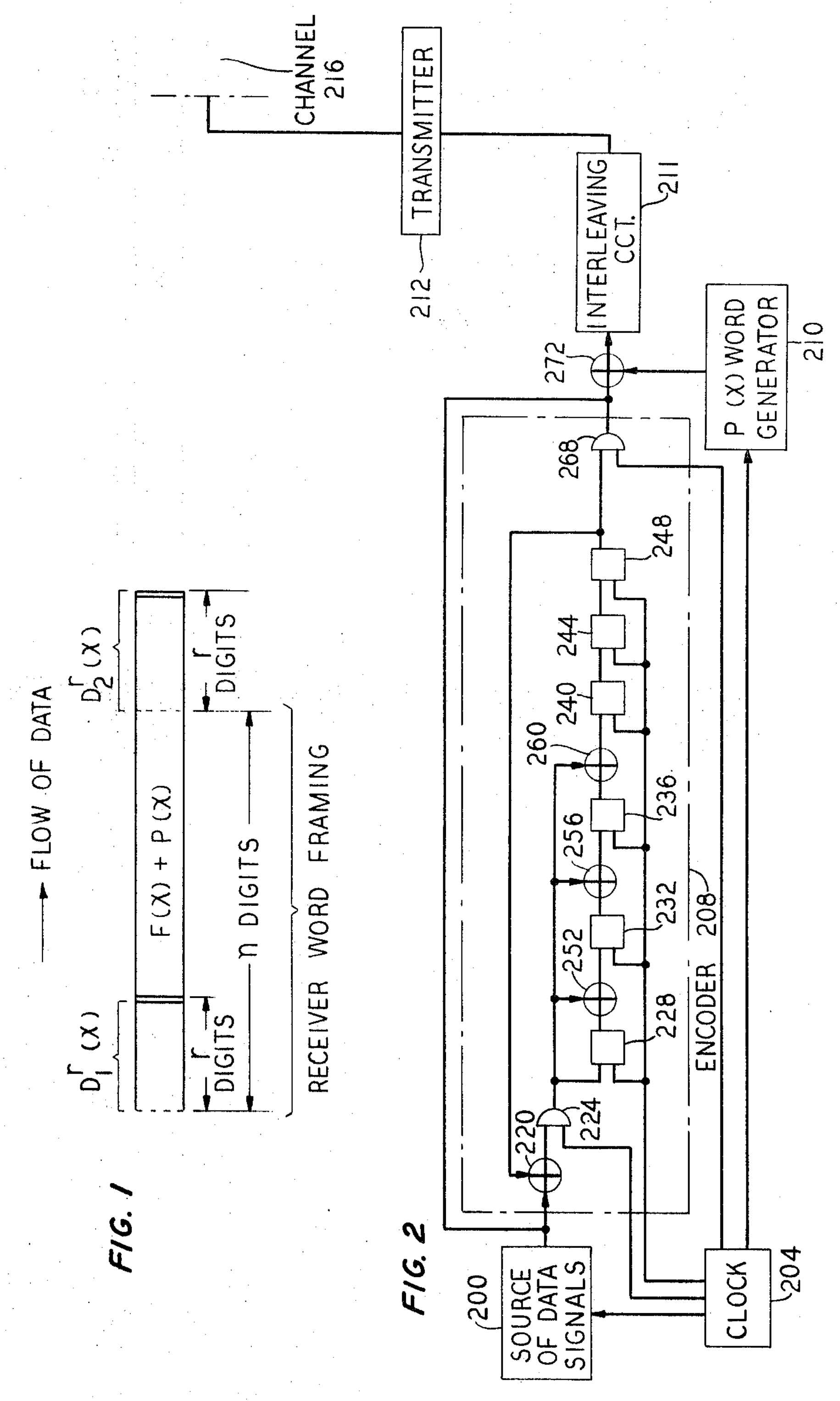
FIG. 1 graphically depicts a synchronization loss.
FIGS. 2 and 3 show, respectively, transmitting and receiving terminals comprising a specific illustrative synchronization recovery system employing a (15, 9) burst-error-correcting binary cyclic code capable of correcting error bursts of length three or less and of correcting one bit synchronization gains or losses.

Before discussing the drawing in detail, it will be helpful to briefly the algebraic representation of cyclic codes and coding processes and to illustrate applicant's synchronization recovery scheme using such algebraic representation. In general, a subspace $V$ of $n$-tuples is called a cyclic code if for each vector $v=(a_0, ..., a_{n11})$ in $V$, the vector $v'=(a_{n11}, a_0, ..., a_{n12})$ is also in $V$. By considering each $n$-tuple as an element of the algebra $A_n$ of polynomials modulo $x^n-1$, each $n$-tuple $(a_0, ..., a_{n11})$ may be associated with a polynomial $$F(x)=a_0+...+a_{n-1}x^{n-1} \qquad (1)$$

in the residue class modulo $x^n-1$ (see the aforecited Peterson text, page 137). It is useful, therefore, to represent a $k$-digit information sequence by a polynomial of the form, $$A(x)=a_0+a1x+...+a_{k-1}x^{k-1} \qquad (2)$$

in which each of the coefficients $a_0, a_1, ..., a_{k11}$ represents a symbol of the coding alphabet (or element in the finite field over which the code is defined). If, for example, a binary code were being used, then the coefficients $a_0, a_1, ..., a_{k11}$ would represent either a 0 or 1. The binary sequence 10101, for example, would then be represented by the polynomial $1+x^2+x^4$. If a ternary code were being used, then the coefficients $a_0, a_1, ..., a_{k11}$ would represent 0, 1, or 2, etc. With such representation of information sequences, the information digits corresponding to the high-order coefficients are thought of as being transmitted first.

Specific cyclic codes are generally defined over a finite field of $q$ elements and in terms of a generator polynomial $G(x)$ of degree $n-k$. The $n-k$ check digits discussed earlier may be obtained by dividing the $k$-digit data word having $n-k$ 0's appended to it [represented by $x^{n-k}A(x)$] by the generator polynomial $G(x)$. The remainder or residue $R(x)$ represents the check digit sequence to be subtracted from the data word $x^{n-k}ax)$. The code words of any $n$-digit cyclic code can thus be represented by $$F(x)=x^{n1k}A(x)-R(x)=a_0'+a_1'x^i+...a_{n11}'x^{n11} \qquad (3)$$

which is of the same form as equation (1).

A $b$-burst-error-correcting cyclic code corrects all bursts of the form represented by the polynomial $$B(x)=x^s(r_0+r_1x+,...+r_{c11}x^{c11}) \text{ modulo } x^n-1 \qquad (4)$$

where $0<c\leq b-1$, $r_0\neq 0$, $r_{c11}\neq 0$ and $s<n$. An end-around burst will be defined as $$B'(x)=x^s(r_0+r_1x+...+_{c11}x^{c11}) \text{ modulo } x^{n11} \qquad (5)$$

just as above but with the additional constraint that $S+c-1\geq n$. In other words, an end-around burst is one in which the errors are "clustered" on each end of the data word. Any burst-error-correcting cyclic code which can correct a burst $B(x)$ can also correct an end-around burst $B'(x)$. Such end-around bursts are not, however, considered very likely to occur in a transmission channel subject to burst errors and therefore there is little need to correct such bursts. Applicant's invention utilizes such end-around error patterns to automatically correct synchronization slippage.

Assume now that the preselected digital sequence to be added to the code words to be transmitted, as discussed earlier, is represented by the polynomial $P(x)$. Thus, the sequence to ultimately be transmitted can be represented as $$F(x)+P(x) \qquad (6)$$

Further assume that upon transmission of this sequence, an $r$-symbol synchronization loss between the transmitting and receiving equipment occurs. The received sequence, as seen by the decoder or receiver can be represented as $$x^r[F(x)+P(x)]+D_1^r(x)-x^nD_2^r(x) \qquad (7)$$

where $D_1^r(x)$ represents the portions of the next data word included in the word framing and $D_2^r(x)$ represents the higher order $r$ digits of the transmitted data word not included in the word framing. This is illustrated in FIG. 1. Although the value of $D_1^r(x)$ is unknown, it is known to have a degree of at most $r-1$.

Consistent with applicant's invention as discussed earlier, the same preselected digital sequence $P(x)$ which was added at the transmitting end is also subtracted at the receiving end. After this subtraction, the resulting sequence can be represented as $$L(x)=x^r[F(x)+P(x)]+D_1(x)-x^nD_2^rx)-P(x) \qquad (8)$$

Since we are dealing with the algebra $A_n$ of polynomials modulo $x^n-1$, then $$x^n=1$$

and $x^nD_2^r(x)$ reduces to $D_2^r(x)$, thus $$L(x)=(x^r-1)P(x)+^rF(x)+D_1^r(x)-D_2r(x)$$

or $$L(x)=(x^r-1)P(x)+D_3^r(x) \text{ modulo } G(x) \qquad (9)$$

where $D_3^r(x)=D_1^r(x)-D_2^r(x)$ is a polynomial of degree at most $r-1$. The term $x^rF(x)$ falls out in expression (9) since $F(x)$ and thus $x^rF(x)$ are code words and therefore evenly divisible by $G(x)$.

Figures 4, 6:
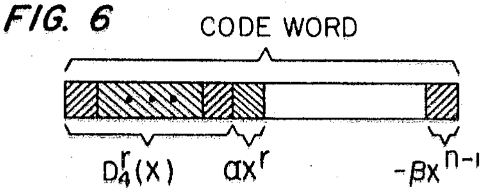
FIG. 4 depicts in tabular form the data contents of the encoder 208 of FIG. 2 after application to the encoder of certain information bits.
FIG. 6 illustrates a code word having an end-around burst error configuration.

Now let $P(x)=\alpha+\beta x^{n-1}$ where $\alpha$ and $\beta$ are nonzero elements of the field over which the code is defined. Then $$\begin{aligned} L(x)&=(x^r-1)(\alpha+\beta x^{n11})+D_3^r(x) \\ &=D_3^r(x)+\beta x^{n+r11}-\nu^{n11}\alpha x^r-\alpha \\ &=D_3^r(x)+\beta x^{r11}-\beta x^{n11}+\alpha x^r-\alpha \text{ modulo } G(x) \\ &=D_4^r(x)-\nu^{n11}+\alpha x^r \qquad (10) \end{aligned}$$

where $D_4^r(x)=D_3^r(x)+\beta x^{r11}-\alpha$ is a polynomial of degree at most $r-1$. It is apparent that $L(x)$ takes the form of an end-around burst of length $r+2$ as illustrated in FIG. 6 (the shaded region identifies the error burst).

If $b \geq r+2$m tgeb $L(x)$ can be recognized by the decoder and thus utilized for correcting $r$-symbol synchronization slippages. That is, if the error pattern obtained in decoding includes $-\beta$ in the position corresponding to $x^{n11}$ and $\alpha$ in the position corresponding to $x^r$, then a synchronization loss of $r$ symbols is indicated. Similarly, it can be shown that $P(x)=+\beta x^{n11}$ can be utilized to cause the generation of an end-around burst error pattern of length $r+2$ in which the positions corresponding to $x^0$ and $x^{n1r11}$ contain the symbols $-\alpha$ and $\beta$ respectively if an $r$-symbol synchronization gain occurs.

In summary of the above, it has been shown that a cyclic burst-error-correcting code capable of correcting bursts of length $b$ can also be utilized, without additional redundancy, to correct synchronization gains or losses of $b-2$ symbols or less. The decision rules for decoding when $P(x)=+\beta x^{n11}$ are:

If the error pattern of a received word is an end-around burst of length $b$ or less, and if (1) the $x^{n11}$ position contains $-\beta$ and the next higher order position $x^r$ which contains a nonzero element, contains $\alpha$, then it is assumed that an $r$-symbol synchronization loss has occurred, or if (2) the $x^0$ position contains $-\alpha$ and the next lower position $x^{n1r1}$which contains a nonzero element, contains $\beta$ then it is assumed that an $r$ symbol synchronization gain has occurred.

A specific example illustrating the above-discussed capabilities of cyclic burst-error-correcting codes will now be given.

Consider the (15, 9) binary cyclic code whose generator polynomial is $$G(x)=1+x+x^2+x^3+x6=\mathbf{1111001}.$$

Since this code can correct bursts of length three (see the Peterson text, page 187), according to applicant's scheme, it can also be utilized to correct synchronization gains or losses of one symbol, or in this case, one bit. For this example, if $P(x)=1+{}^{n-1}$, the decision rules given above reduce to:

(1) If the bits of the received word corresponding to $x^{14}$ and $x^1$ are determined to be in error (i.e., if the error pattern word contains 1's in these positions), it will be assumed that a one-bit synchronization loss has occurred;

(2) If the bits of the received word corresponding to $x^0$ and $x^{13}$ are determined to be in error (i.e., if the error pattern word contains 1's in these positions), it will be assumed that a one-bit synchronization gain has occurred.

The preselected sequence to be added at the transmitter and subtracted at the receiver is $$P(x)=1+x^{14}=\mathbf{100000000000001}.$$

Now assume that the data $$A(x)=x^2+x^3+x^5+x^8=\mathbf{001101001}$$

is to be transmitted. To generate the appropriate code word, the polynomial $x^{n1k(}x)=x^6\cdot(x^2+x^3+x^5+x^8)=x^8+x^9+x^{11}+x^{14}$ would be divided by the generator polynomial $G(x)$ and the remainder added (addition is the same as subtraction for the binary case) to $x^8+x^9\nu^{11}+x^{14}$. This would give the code word 100001001101001 which would then be added (modulo 2) to $P(x)$ to obtain the word to be transmitted or,

```
  100001001101001  -  code word
⊕ 100000000000001  -  P(x)
  000001001101000  -  modified code word
```

Now assume that a one-bit synchronization loss occurs as indicated by the arrows in the diagram below (the commas represent the true framing).

```
                      message
                      flow
                      ───►
00,000001001101000,11
↑                 ↑
receiver framing
```

At the receiving terminal, $P(x)$ would be subtracted (or added in this case) from the word shown between the arrows, above, or

```
  000000100110100  -  received word
⊕ 100000000000001  -  P(x)
  100000100110101  -  M1(x)
```

The syndrome of the message $M_1(x)$, which is the remainder of $M_1(x)/G(x)$, is then obtained and from this the error pattern can be derived (see W. W. Peterson's text, Chapter 9). The syndrome in this case is $S_1=\mathbf{101001}=1+x^2+x^5$. The error pattern of interest (that which indicates the shortest length error burst) associated with this syndrome is obtained as follows. Multiply the syndrome $S_1$ by $x$ and reduce; thereby $xS_1=x(1+x^2+x^5)$ $=x+x^3+x^6$ $=x+x^3+(1+x+x^2+x^3)$ modulo $G(x)$ in $A_n$ $=1+x^2=\mathbf{101000}$ modulo $G(x)$ in $A_n$.

Dividing $xS_1$, by $x$, we obtain $$\frac{xS_1}{x}=S_1=\frac{1+x^2}{x}=x^{-1}+x=x^{14}+x \qquad \text{modulo } x^{14}$$

which is the error pattern associated with the syndrome $S_1$. Since this pattern identifies $x^{14}$ and $x^1$ as being in error, according to the decision rule (1), it is assumed that a one-bit synchronization loss has occurred which, in fact was the case.

Assume now that the same code word as above is transmitted, but that a one-bit sychronization gain takes place. The message seen by the receiver would thus be that illustrated below.

```
                     message
                     flow
                     ───►
00,000001001101000,11
 ↑                ↑
 receiver framing
```

As before, at the receiving terminal, $P(x)$ would be subtracted (added) from the word shown between the arrows, or

```
  000010011010001  -  received code word
⊕ 100000000000001  -  P(x)
  100010011010000  -  M2(x)
```

The syndrome of $M_2(x)$ is $S_2=\mathbf{010010}=x+x^4$. Multiplying $S_2$ by $x^2$, we obtain $x^2S_2=x^3+x^6=x^3+(1+x+x^2+x^3)$ modulo $G(x)$ $=1+x+x^2{}_{111000}$ modulo $G(x)$ which is a burst of length three and correctable by the (15, 9) code. Dividing by $x^2$ we obtain $$\frac{x^2S_2}{x^2}=S_2=\frac{1+x+x^2}{x^2}=x^{-2}+x^{-1}+1$$

$$=x^{14}+x^{13}+1 \qquad \text{modulo } x^{14}$$

which is the error pattern associated with the syndrome $S_2$. According to decision rule (2), since this pattern identifies $x^0=1$ and $x^{n1r11}=x^{151111}=x^{13}$ as being in error, it is assumed that a one-bit synchronization gain has occurred as required.

For transmission channels subject to large error bursts, it is often desirable to interleave the code words before transmission. Interleaving can also be utilized to increase the synchronization correction ability of burst-error-correcting codes. The method of interleaving is schematically shown below where $a_{i,j}$ denotes the entry of the $i^{th}$ symbol of the $j^{th}$ subcode and $a_{i,j}$ arrived at the decoder at the time $im+j$, where $m$ is the interleaving degree. In other words, each row is a code word and transmission of data is by columns, starting with $a_{0,0}$, ending with $a_{n11,m11}$.

$$\begin{matrix} a_{0,0} & a_{1,0} & \cdots & a_{n-1,0} \\ a_{0,1} & a_{1,1} & \cdots & a_{n-1,1} \\ & \vdots & & \\ a_{0,m-1} & a_{1,m-1} & \cdots & a_{n-1,m-1} \end{matrix}$$

If an $r$-symbol synchronization gain occurs, where $r=cm+s$, $0\leq s\leq m-1$, and $c$ is an integer, the words framed by the decoder can be represented as shown below:

$$
\begin{array}{cccccc|ccc}
\multicolumn{9}{c}{\longleftarrow\text{ n symbols }\longrightarrow} \\
a_{c,s} & a_{c+1,s} & \cdots & \cdots & a_{n-1,s} & & b_{0,s} & \cdots & b_{c-1,s} \\
\vdots & & & & & & & & \\
a_{c,m-1} & a_{c+1,m-1} & \cdots & \cdots & a_{n-1,m-1} & & b_{0,m-1} & \cdots & b_{c-1,m-1} \\
a_{c+1,0} & a_{c+2,0} & \cdots & a_{n-1,0} & b_{0,0} & & \cdots & \cdots & b_{c,0} \\
\vdots & & & & & & & & \\
a_{c+1,s-1} & a_{c+2,s-1} & \cdots & a_{n-1,s-1} & b_{0,s-1} & & \cdots & \cdots & b_{c,s-1}
\end{array}
$$

m symbols cm+s symbols where the symbols $b$ are code word symbols of the group of code words transmitted just before code word group comprising the symbols $a$. As can be seen from the above diagram, the first $m-s$ code words have a $c$-symbol synchronization gain while the remaining $s$ code words have a $(c+1)$-symbol synchronization gain. If the type of code employed is a $b$-burst-error-correcting cyclic code as discussed above, the synchronization gain of each code word can be detected given that $c+1\leq b-2$. That is, for a $b$-burst-error-correcting cyclic code interleaved to degree $m$, synchronization slippage in each code word of $r=(c+1)m=(b-2)m$ symbols can be corrected. In practice, however, it is possible to provide even greater protection against synchronization slippage than this. As noted earlier, the first $m-s$ code words in the diagram above have only a $c$-symbol synchronization gain. These code words could be corrected as long as $c\leq b-2$ (rather than the more restrictive condition $c+1\leq b-2$ given above). If upon detecting the $c$-symbol synchronization gain in the first word, synchronization is back-set $cm$ symbols, then the remaining $m$-$s$-1 code words of the first $m$-$s$ code words will show no synchronization gain, while the last $s$ code words will show only a single-symbol synchronization gain which can be easily detected and corrected. Thus, if at least one code word in the group being examined for synchronization slippage has only a $c$-symbol gain and if $c\leq b-2$, then a maximum synchronization gain of $r=(b-2)m+m-1=(b-1)\ m-1$ symbols can be corrected provided that $b\geq3$.

For an $r$-symbol synchronization loss, the first $s$ code words of the group being examined will have a $(c+1)$-symbol loss and the remaining $m$-$s$ code words a $c$-symbol loss. In this case, in order to correct up to an $r=(b-1)m-$symbol loss, the last code words in the array would have to be checked first and corrected before checking the code words in the first portion of the array.

Figure 3:
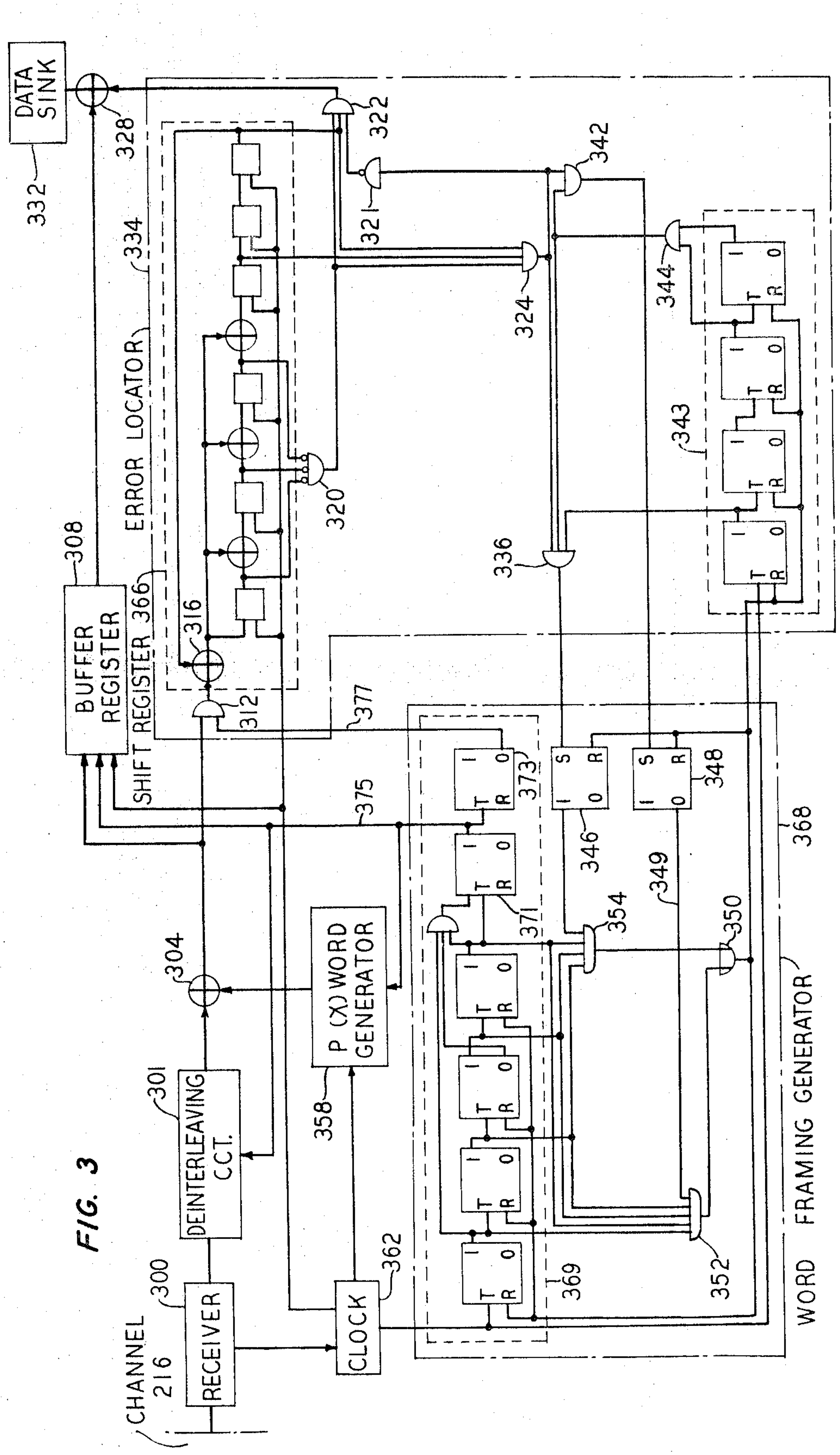

FIGS. 2 and 3, respectively, show a transmitting terminal and a receiving terminal of an illustrative data transmission system utilizing the principles of the present invention. A description of the system of FIGS. 2 and 3 will first be given assuming that no interleaving of code words is done (i.e., assuming that the interleaving circuit 211 and the deinterleaving circuit 301 are not present in the system).

Data signals to be transmitted to the receiving terminal are applied by a data source 200 simultaneously to an encoder 208 and a modulo-2 adder 272. The data signals applied to the modulo-2 adder 272 are added to a corresponding portion of a predetermined binary word $P(x)$ applied by a $P(x)$ word generator 210 and the resultant is applied to a transmitter 212. The transmitter 212, in turn, transmits the signals via a data channel 216 to the receiving terminal.

For every group of $k=9$ data or information signals received from the data source 200, the encoder 208 generates $n-k=6$ check digits. This is accomplished with a six-stage shift register, the first four stages of which are interconnected by modulo-2 adders 252, 256, and 260. Each of the stages 228, 232, ..., 248 comprises a simple one-bit storage device. Each data signal applied by the data source 200 to the encoder 208 is added by a modulo-2 adder 220 to the contents of the last stage 248 of the shift register before being applied to an AND gate 224. AND gate 224 is concurrently enabled by clock 204 to pass the output of adder 220 to the stage 228. Similarly, the output of AND gate 224 is applied to the modulo-2 adders 252, 256, and 260. Upon each application of a data signal, the contents of the shift register are shifted by one stage. After nine data signals have entered the shift register, the six bits in the register represent the remainder that would be obtained by dividing the nine information signals by the generator polynomial $G(x)$ of the (15, 9) code being used. (As given earlier, $G(x)=+x+x^2+x^3+x^6$ for this particular code.) This remainder constitutes the check digits to be transmitted to the receiving terminal. (See the previously cited Peterson text, page 149 through 150.)

After each application of a group of nine data signals by the data source 200 through the encoder 208, a clock 204 signals the data source 200 to inhibit the further application of the data signals. The clock 204 then applies a succession of six pulses to the shift register, thereby causing the contents of the shift register to be applied to an AND gate 268. The AND gate 268, in response to pulses received from the clock 204, applies each bit to a modulo-2 adder 272 where they are added to the remaining corresponding portion of the word $P(x)$ applied by the $P(x)$ word generator 210 and the sum applied to the transmitter 212. The six bits comprise the check digits for the previously transmitted nine information or data signals. Together these bits plus the addition of $P(x)$ comprise a complete code word. The transmitter 212 transmits the code word via the data channel 216 to the receiving terminal. After the check digits have been transmitted, the clock 204 removes the inhibit signal from the data source 200 so that the data source may commence to apply a new group of nine information or data signals to the encoder 208 and the modulo-2 adder 272.

The various steps in encoding the nine-bit word 001101001 of the earlier example by the encoder 208 is shown in FIG. 4. The left-hand column of FIG. 4 shows the information bits which are applied to the encoder 208 while the right-hand column shows the contents of the encoder 208 after the application of the information bit shown in the left-hand column. After the generation and shifting out of any check bits by the encoder 208 and before the application of new information bits, the contents of the encoder 208 is 000000. As shown in FIG. 4, after the application of the bit 1, the contents of the encoder is 111100. After all nine bits of the word in question have been applied to the encoder the contents of the encoder is 100001 which will be recognized as being the check digits necessary to provide correction for the word 001101001 (given in the earlier example).

FIG. 3 shows the receiving terminal of the illustrative data system including a receiver 300 which receives each data word transmitted via the data channel 216 from the transmitting terminal. Each received word is applied to a modulo-2 adder 304 where it is added to the same word $P(x)$ which was added at the transmitting end. (In all but the binary case, $P(x)$ would be subtracted from the received word. Subtraction and addition are the same, however, in the binary case.) The word $P(x$is applied to the modulo-2 adder 304 by a $P(x)$ word generator 358. Each modulo-2 sum of a received word and the word $P(x)$ is applied both to a buffer register 308 and an error locator 334. The error locator 334 includes a modulo-2 adder 316 whose output is connected to a six-stage shift register 366. Each stage of the shift register 366 stores a single bit of information.

After an entire received word is applied to the buffer register 308 and the error locator 334, the word is shifted from the buffer register 308 one bit at a time and applied to a modulo-2 adder 328. As the contents of the buffer register 308 are being applied to the modulo-2 adder 328, the contents of the shift register 366 are being circulated. That is, as each bit is shifted from the buffer register 308, the contents of the shift register 366 are shifted one stage to the right with the bit stored in the last or rightmost stage being reapplied to the modulo-2 adder 316. The appearance of all 0's in the first or leftmost three stages of the shift register 366 indicates that a burst error pattern is contained in the last three stages of the shift register and that the erroneous bits are about to be shifted out of the buffer register 308 (see W. W. Peterson, pages 193 and 194). The presence of three 0's in the first three stages of the shift register causes the enablement of NOT-AND gate 320 which in turn causes the enablement of an AND gate 322 which allows the contents of the last three stages of the shift register 366 to be applied to the modulo-2 adder 328 where they are added to the bits emerging from the buffer register 308. The addition (subtraction in nonbinary case) of the error pattern "word" of the shift register to the erroneous bits emerging from the buffer register 308 results in the erroneous bits being changed to the correct bits. The corrected word is then applied to a data sink 332.

The error locator 334 also comprises a counter 343 and other logical circuitry for utilizing the information from the shift register 366 to determine whether or not a synchronization slippage of up to one bit has occurred between the transmitting and the receiving terminal. Upon detecting a synchronization slippage, a word framing generator 368 is signaled to either back-set or advance the word framing depending upon whether a synchronization gain or loss, respectively, was detected.

Synchronization slippage is indicated when the particular error patterns identifying a synchronization loss or gain appear in the shift register 366. That is, when the bits corresponding to the positions $x^{14}$ and $x^1$ are in error, a synchronization loss is indicated and when the bits corresponding to $x^{13}$ and $x^0$ are in error, a synchronization gain is indicated. It will be remembered that the higher order bits of a received code word are shifted into the buffer register 308 and the shift register 366 first. Thus, of course, the first bits to be applied by the buffer register 308 to the modulo-2 adder 328 (and whose error pattern counterparts first appear in the rightmost three-shift register stages of the error locator 334) are the higher order bits. For example, after a received 15-bit word has been entered into the buffer register 308 and the error locator 334 the first bit to thereafter be applied to the modulo-2 adder 328 (and whose error pattern counterpart is present in the rightmost shift register stage of the shift register 366), is that corresponding to $x^{14}$.

As each bit is applied by the buffer register 308 to the modulo-2 adder 328 (as controlled by clock 362), the shift register 366 shifts its contents one stage to the right (with the contents of the last stage being applied to both the AND gate 322 and the modulo-2 adder 316) and upon each shift of the shift register 366, the counter 343 (beginning from a count of zero) increases its count by one (again under control of clock 362). When the counter 343 reaches a count of 13, the rightmost and the third from the rightmost (i.e., the sixth and fourth) stages of the shift register 366 contain error pattern bits corresponding to the positions $x^{14}$ and $x^{14+2}=x$, respectively. Thus, if when the counter 343 reaches a count of 13 (13 shifts of the shift register), the shift register of the error locator 334 contains all 0's in its first three stages and 1's in its fourth and sixth stages, then a synchronization loss is indicated. By the same reasoning, if when the counter 343 reaches a count of 12, the shift register 366 contains all 0's in its first three stages and 1's in its fourth and sixth stages (this time corresponding to the positions $x^{13+2}=x^0$ and $x^{13}$, respectively), then a synchronization gain is indicated.

Before discussing the synchronization correction procedure, it will be helpful to first discuss the operation and function of the word-framing generator 368. The word-framing generator includes primarily a counter 369 which in its normal operation counts 15 bit times before resetting to begin counting again. Each count is in response to a pulse from the clock 362 which is driven by the received data. When the counter 369 reaches a count of nine (corresponding to the number of information bits in a word), a flip-flop 371 of the counter 369 is set thereby resulting in the application of a word-framing signal to lead 375. In the normal operation, after six more counts, the first four stages of the counter 369 would be reset causing the resetting of flip-flop 371, removal of the word-framing signal from lead 375, and setting of a flip-flop 373. Application to and removal from lead 375 of the word-framing signal indicates to the $P(x)$ word generator 358 and the buffer register 308 which of any bits being received are information bits and which are error check bits. That is, when a signal is being applied to lead 375, the bits being received are to be considered information bits; when no signal is being applied, the bits are to be considered check bits.

Under normal operation, after the counter 369 completes its count of 15, the state of flip-flop 373 is changed. While the receiver 300 is applying a received word to the AND gate 312, the flip-flop 373 resides in the reset state so that AND gate 312 is enabled via a lead 377 to thereby allow the application of the received word to the error locator 334. After each received word has been applied to the error locator 334 and the counter 369 has reached a count of 15, the flip-flop 373 is set thereby causing the removal of the enabling signal from lead 377. For the next 15 counts while the buffer register 308 is applying the received word to the modulo-2 adder 328 and while the error locator 334 is performing its error location function, no subsequently received words may be applied to the error locator 334. (In practice, the receiving terminal would probably comprise two error locators so that while a received word was being applied to one error locator, the other locator could be decoding the previously received word. For simplicity, only a single error locator is shown in the illustrative embodiment of FIG. 3.)

The correction of synchronization slippages will now be discussed. As noted above a synchronization loss is indicated when the counter 343 reaches a count of 15 and the shift register of the error locator 334 contains all 0's in the first three stages and 1's in the fourth and sixth stage. When these conditions obtain, and AND gate 324 is enabled which together with the enablement of AND gate 344 by the counter 343 causes the enablement of an AND gate 336 (since the counter 343 has attained a count of 13) and thus the setting of a flip-flop 346 of the word-framing generator 368. Setting of the flip-flop 346 in conjunction with the counter 369 reaching a count of 14 causes the enablement of an AND gate 354 which, in turn, enables an OR gate 350 thereby resetting the counter 369 after only 14 counts. Causing the counter 369 to reset after only 14 counts rather than the usual 15 in effect advances the word synchronization by temporarily shortening the word-framing period.

It should be noted here that the enablement of AND gate 324 upon detection of a synchronization slippage also causes the removal of one input —that being applied via an AND-NOT gate 321—from AND gate 322. Thus, the error pattern obtained from a synchronization slippage will not be added (modulo-2) to the bits emerging from the buffer register 308.

FIG. 5 shows in tabular form the various steps in decoding the particular code word used in the previous examples by the receiving terminal of FIG. 3 assuming a synchronization loss has occurred. In particular, if the code word transmitted is $$F(x)+P(x)=000001001101000,$$

then the word received (after occurrence of a synchronization loss) is 000001001110100. After adding $P(x)$ =100000000000001 to this word, the sequence 100001001110101 is obtained for decoding. The left-hand column of FIG. 5 gives the bits of the word to be decoded with the first bit 1 in the left-hand column corresponding to the first bit applied to the error locator 334 of FIG. 3, etc. That portion of the right-hand column opposite this word shows the contents of the shift register after the application of the corresponding bit in the left-hand column. The remaining portion of the right-hand column shows the contents of the shift register 366 after successive shifts of the shift register. It will be noted that after the 13the shift of the shift register at which time the counter 343 would register a count of 13, the contents of the register are 000101 which is the pattern indicating a synchronization loss, as required.

A synchronization gain is indicated when the counter 343 reaches a count of 12 and the shift register 366 contains all 0's in the first three stages and 1's in the fourth and sixth stage. Under these conditions, AND gate 324 is again enabled which in conjunction with the enablement of AND gate 344 by the counter 343 causes the enablement of an AND gate 342. The enablement of AND gate 342 causes the setting of flip-flop 348 so that the usual "high" condition on lead 349 is removed. With the "high" condition removed from lead 349, AND gate 352 is not enabled when the counter 369 reaches a count of 15 but rather, the counter 369 is allowed to count one more count than usual —a count of 16 —before resetting. In this manner, synchronization is back-set one bit as needed to correct the synchronization gain.

Resetting of the counter 369 is caused by enablement of the OR gate 350 which also causes resetting of the counter 343 and the flip-flops 346 and 348 in preparation for decoding the next received word.

As discussed earlier, if interleaving of code words of degree $m$ is employed, then synchronization slippage of up to $(b-1)m-1$ symbols can be corrected. Thus, if, as in the earlier example for one-bit synchronization correction, $b=3$, and if $m=5$, then synchronization slippages of up to nine bits may be corrected.

Including the interleaving circuit and deinterleaving circuit in the system of FIGS. 2 and 3 provides the system with greater synchronization correcting ability. The interleaving circuit 211 and deinterleaving circuit 301 are straightforward embodiments of well-known state of the art devices.

Although a specific code (the [15, 9]burst-error-correcting cyclic code) was utilized to illustrate the present invention, the principles of the invention are clearly applicable to any code meeting the requirements set forth.

It is noted that detailed circuit configurations for the units 204, 210, and 212 of FIG. 2, and 300, 308, 358, and 362 of FIG. 3, have not been given herein because their arrangements are considered to be clearly within the skill of the art.

Finally, it is understood that the above-described arrangements are only illustrative of the applications of the principles of the present invention. Numerous other arrangements may be devised by those skilled in the art without departing from the spirit and scope of the invention.

I claim:

1. In combination in a data communication system:
a source of data signals;
means for encoding said signals in a burst-error-correcting cyclic code capable of correcting error burst of $\leq b$ symbols in length;
means for adding to each encoded word a predetermined digital sequence;
means for applying the digital sequences obtained from said addition to one end of a communication channel;
means connected to the other end of said channel for subtracting from each received sequence the said predetermined digital sequence;
means for decoding the sequence obtained from said subtraction to obtain error patterns indicating the occurrence of errors at each end of said received sequences; and
synchronization recovery means responsive to the generation of said error patterns for correcting loss of synchronization of $\leq b$-2 symbols in said communication system.

2. A combination as in claim 1 in which said decoding means further comprises means for generating error patterns indicating the occurrence of error bursts of length $i$ in said received sequences, where $i$ is any integer $\leq b$.

3. A combination as in claim 2 further comprising means responsive to the generation of said burst-error patterns for correcting the errors in said received sequences.

4. In combination in a data communication system;
a source of data signals;
means for encoding said signals in an $(n,k)$ burst-error-correcting cyclic code capable of correcting error bursts of $\leq b$ symbols in length;
means for adding to each encoded word a preselected digital sequence represented by $P(x)=+\beta x^{n11}$, where $\alpha$ and $\beta$ are code symbols $\neq 0$;
means for applying the sequences obtained from said addition to one end of a transmission channel;
receiving means connected to the other end of said channel for receiving said sequences
means connected to said receiving means for subtracting said preselected digital sequence from each received digital sequence;
error locator means for processing the digital sequences obtained from said subtraction to obtain error pattern words for each of said received sequences; and
synchronization correcting means responsive to said error locator means determining that the positions represented by $x^{n11}$ of a received digital sequence contains the symbol $-\beta$ and that the next higher order position $x^r$ which contains a nonzero symbol contains the symbol $\alpha$, where $r \leq b-2$, for advancing the synchronization of said data communication system $r$ symbols, and responsive to said error locator means determining that the positions represented by $x^0$ contains the symbol $-\alpha$ and that the next lower order position $x^{n1r11}$ which contains a nonzero symbol contains the symbol $\beta$, for back-setting the synchronization of said system $r$ symbols.

5. A combination as in claim 4 further comprising means connected to said adding means for interleaving said encoded words before applying said words to said transmission channel, and means connected to said receiving means for deinterleaving the received interleaved sequences before applying said sequences to said subtracting means.

6. A data communication system including a transmitting and receiving terminal interconnected by a transmission channel,
said transmitting terminal comprising:
a source of data signals;
means for encoding said signals in a burst-error-correcting binary cyclic code capable of correcting error bursts of $\leq b$ bits;
means for generating a predetermined binary sequence;
means for adding by addition modulo-2 said predetermined binary sequence to each of the code words generated by said encoding means; and
means for transmitting the words obtained from said addition to said receiving terminal; and
said receiving terminal comprising:
means for receiving said transmitted words;
means for generating said predetermined binary sequence;
means for adding said predetermined binary sequence to each received word by addition modulo-2;
means for simultaneously applying each binary word obtained from said addition to a buffer register storing means for temporarily storing said word and to an error locator means for generating the error pattern of said word; and
means responsive to the generation of certain end-around burst error patterns for automatically correcting synchronization slippages of $\leq b-2$ bits between said transmitting and receiving terminals.

7. A combination as in claim 6 wherein said predetermined binary sequences generated by each of said sequence generating means are equal to the binary sequence represented by $P(x)=1+x^{n-1}$, where $n$ is the length of said code words.

8. A combination as in claim 7 wherein said error locator means comprises logic means for generating a first error pattern represented by $a(x)+^r+x^{n11}$, where $a(x)$ represents any binary sequence of degree $\leq r-1$, upon the occurrence of an $r$-bit synchronization loss, and for generating a second error pattern represented by $x^0+x^{n1r11}+x^{n1r}a(x)$ upon the occurrence of an $r$-bit synchronization gain.

9. A combination as in claim 8 wherein said synchronization correcting means includes means responsive to said logic means generating said first error pattern for advancing the word framing of said data communication system $r$ bits, and responsive to said logic means generating said second error pattern for back-setting said word framing $r$ bits.

10. A combination as in claim 7 in which said error locator means comprises a feedback shift register and associated logic for shifting and circulating said applied words to obtain said error patterns, counting means for maintaining a count of the number shifts performed by said shift register upon each of said words, and means responsive to said shift register and said counting means for signaling said synchronization correcting means to advance the word framing of said data communication system upon determining that the positions $x^r$ and $x^{n11}$ of a received word are in error, and for signaling said synchronization correcting means to back-set the word framing of said system upon determining that the positions $x^0$ and $x^{n1r11}$ are in error.

11. A combination as in claim 10 in which said synchronization correcting means comprises a binary counting circuit and associated logic for reducing the word-framing period of said data communication system in response to an "advance" signal from said error locator, and for extending the word-framing period of said system in response to a "back-set" signal from said error locator means.

12. A combination as in claim 6 further comprising means responsive to the generation of error patterns indicating the occurrence of error bursts in said received code words of length $i$, where $i$ is any integer$\leq b$, for automatically correcting said error bursts.

13. A combination as in claim 6 wherein said transmitting terminal further comprises means connected to said adding means for interleaving said words obtained from said subtraction and for applying said interleaved words to said transmitting means, and wherein said receiving terminal further comprises means connected to said receiving means for deinterleaving said received words and for applying said deinterleaved words to the adding means of said receiving terminal.

14. In a data communication system, a transmitting terminal comprising:

a source of data signals;

encoding means for encoding said data signals into a burst-error-correcting cyclic code;

means for modifying the code words of said cyclic code by addition of a predetermined digital sequence, said predetermined sequence chosen such that the modified code words are processable to obtain an end-around burst error pattern when a synchronization slippage occurs between said transmitting terminal and the receiving terminal; and means for applying said modified words to one end of a communication channel.

15. A system as in claim 14 wherein said predetermined sequence is $P(x)$=+$\beta x^{n11}$, where $n$ is the length of said code words, and $\alpha$ and $\beta$ are code symbols$\neq 0$.

16. In a data communication system, a receiving terminal comprising:

means for receiving incoming data sequences encoded in a $b$-burst-error-correcting cyclic code and modified by addition of a predetermined digital sequence;

means for subtracting said predetermined sequence from each received data sequence;

means for decoding the sequence obtained from said subtraction to obtain end-around burst error patterns; and synchronization recovery means responsive to the generation of said error patterns for readjusting synchronization of said system.

17. A system as in claim 16 wherein said predetermined sequence is $P(x)$=+$\beta x^{n11}$, where $n$ is the length of said received sequences and $\alpha$ and $\beta$ are code symbols$\neq 0$.

18. A system as in claim 17 wherein said synchronization recovery means comprises apparatus responsive to said decoding means determining that the $x^{n11}$ position of a received sequence contains the symbol $-\beta$ and that the next higher order position $x^r$ which contains a nonzero symbol contains the symbol $\alpha$, where $r\leq b-2$, for advancing the synchronization of said system $r$ symbols, and responsive to said decoding means determining that the $x^0$ position of a received sequence contains the symbol $-\alpha$ and that the next lower order position $x^{n1r11}$ which contains a nonzero symbol contains the symbol $\beta$, for back-setting the synchronization of said system $r$ symbols.